US012695187B2

(12) United States Patent
Rossanese et al.

(10) Patent No.: US 12,695,187 B2
(45) Date of Patent: Jul. 28, 2026

(54) FULLY-PASSIVE AND FAST-PROGRAMMABLE SMART SURFACE

(71) Applicant: NEC Laboratories Europe GmbH, Heidelberg (DE)

(72) Inventors: Marco Rossanese, Heidelberg (DE); Placido Mursia, Heidelberg (DE); Andres Garcia-Saavedra, Heidelberg (DE); Vincenzo Sciancalepore, Heidelberg (DE); Xavier Costa-Perez, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 46 days.

(21) Appl. No.: 18/730,376

(22) PCT Filed: Apr. 29, 2022

(86) PCT No.: PCT/EP2022/061542

§ 371 (c)(1),
(2) Date: Jul. 19, 2024

(87) PCT Pub. No.: WO2023/147891

PCT Pub. Date: Aug. 10, 2023

(65) Prior Publication Data

US 2025/0125525 A1     Apr. 17, 2025

(30) Foreign Application Priority Data

Feb. 2, 2022     (EP) ..................................... 22154759

(51) Int. Cl.
*H01Q 3/46*          (2006.01)
*H04B 7/04*          (2017.01)
(52) U.S. Cl.
CPC ........... *H01Q 3/46* (2013.01); *H04B 7/04013* (2023.05)

(58) Field of Classification Search
CPC .............................. H01Q 3/46; H04B 7/04013
See application file for complete search history.

(56) References Cited

U.S. PATENT DOCUMENTS

| | | |
|---|---|---|
| 2005/0179614 A1 | 8/2005 | Nagy |
| 2018/0166781 A1* | 6/2018 | Snyder .................. H01Q 21/08 |
| 2020/0350691 A1 | 11/2020 | Somerlock, III et al. |

FOREIGN PATENT DOCUMENTS

EP          3836427 A1     6/2021

OTHER PUBLICATIONS

Liu Yao et al, "Dynamic-Controlled RIS Assisted Multi-User MISO Downlink System: Joint Beamforming Design", IEEE Transactions on Green Communications and Networking, IEEE, vol. 6, No. 2, Jun. 2022, pp. 1069-1081, XP011909522, US.

* cited by examiner

*Primary Examiner* — Henry Luong
(74) *Attorney, Agent, or Firm* — Leydig, Voit & Mayer, Ltd.

(57)          ABSTRACT

A reflective device includes a control element, and a reflective surface with a plurality of reflective elements. Each reflective element of the plurality of reflective elements includes an antenna element and a phase shifting arrangement and is under control of the control element so as to reflect a radio-frequency (RF) signal incident on the reflective surface with an adjustable phase shift. The plurality of reflective elements are connected to the control element via a cell selection bus system that interconnects the plurality of reflective elements.

20 Claims, 5 Drawing Sheets

FULLY-PASSIVE AND FAST-PROGRAMMABLE SMART SURFACE

CROSS REFERENCE TO RELATED APPLICATIONS

This application is a U.S. National Phase application under 35 U.S.C. § 371 of International Application No. PCT/EP2022/061542, filed on Apr. 29, 2022, and claims benefit to European Patent Application No. 22154759.9, filed on Feb. 2, 2022. The International Application was published in English on Aug. 10, 2023 as WO 2023/147891 A1 under PCT Article 21(2).

FIELD

The present invention relates to a reflective device and to a method for operating the same.

BACKGROUND

Reconfigurable Intelligent Surfaces (RIS), also known as Intelligent Reconfigurable Surface (IRS), have emerged as one of the most promising candidate technologies for enhancing spectrum utilization and energy efficiency for upcoming cellular network generations. In short, RIS are radio-frequency (RF) reflectors whose response to imping-ing signals is programmable from a centralized controller.

One of the most important applications of a RIS is to realize passive beamforming onto reflected signals: reflected energy can be maximized towards the direction of the user, in a programmable manner. To this end, an array of reflective elements or unit cells (both terms are sometimes used interchangeably in the present disclosure) applies different phase shifts to the signals each of them reflects. These electromagnetic waves constructively interfere in a specific direction and they must generate a sufficiently narrow beam to serve the selected user without meddling with unwanted devices. No signal processing or amplification devices are involved, but only essential and low power circuit compo-nents, i.e., passive beamforming.

RIS is an emerging technology and up to now only very few prototypes have been proposed in the literature. How-ever, such RIS prototypes have at least some of the follow-ing problems or limitations:

The beamforming steering capability relies on phase shifters with 1 or 2 bit (e.g., corresponding to 2- or 4-phase choices), limiting significantly the span and the precision with which the main reflected beam can be aligned.

The reflective elements of a RIS (i.e. their antennas) are always active, even when not necessary, leading to a huge overhead in the RIS configuration.

The number of active antenna elements and the inter-distance between them is fixed (design choice) and cannot be dynamically changed.

The antenna elements are usually connected directly to the phase shifter to the controller unit, which has a limited amount of free lines that can be assigned. Although there exists microcontrollers with a lot of free lines, they cannot deal with RISs that comprehend thousands of antenna elements or unit cells; having direct connections makes the solution not scalable.

Usually a RIS board is conceived as a standalone device and it does not allow easy cooperation with additional boards.

SUMMARY

In an embodiment, the present disclosure provides a reflective device including a control element, and a reflective surface including a plurality of reflective elements. Each reflective element of the plurality of reflective elements comprises an antenna element and a phase shifting arrange-ment and is under control of the control element so as to reflect a radio-frequency (RF) signal incident on the reflec-tive surface with an adjustable phase shift. The plurality of reflective elements are connected to the control element via a cell selection bus system that interconnects the plurality of reflective elements.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become appar-ent by reading the following detailed description with ref-erence to the attached drawings, which illustrate the follow-ing.

DETAILED DESCRIPTION

Figure 1:
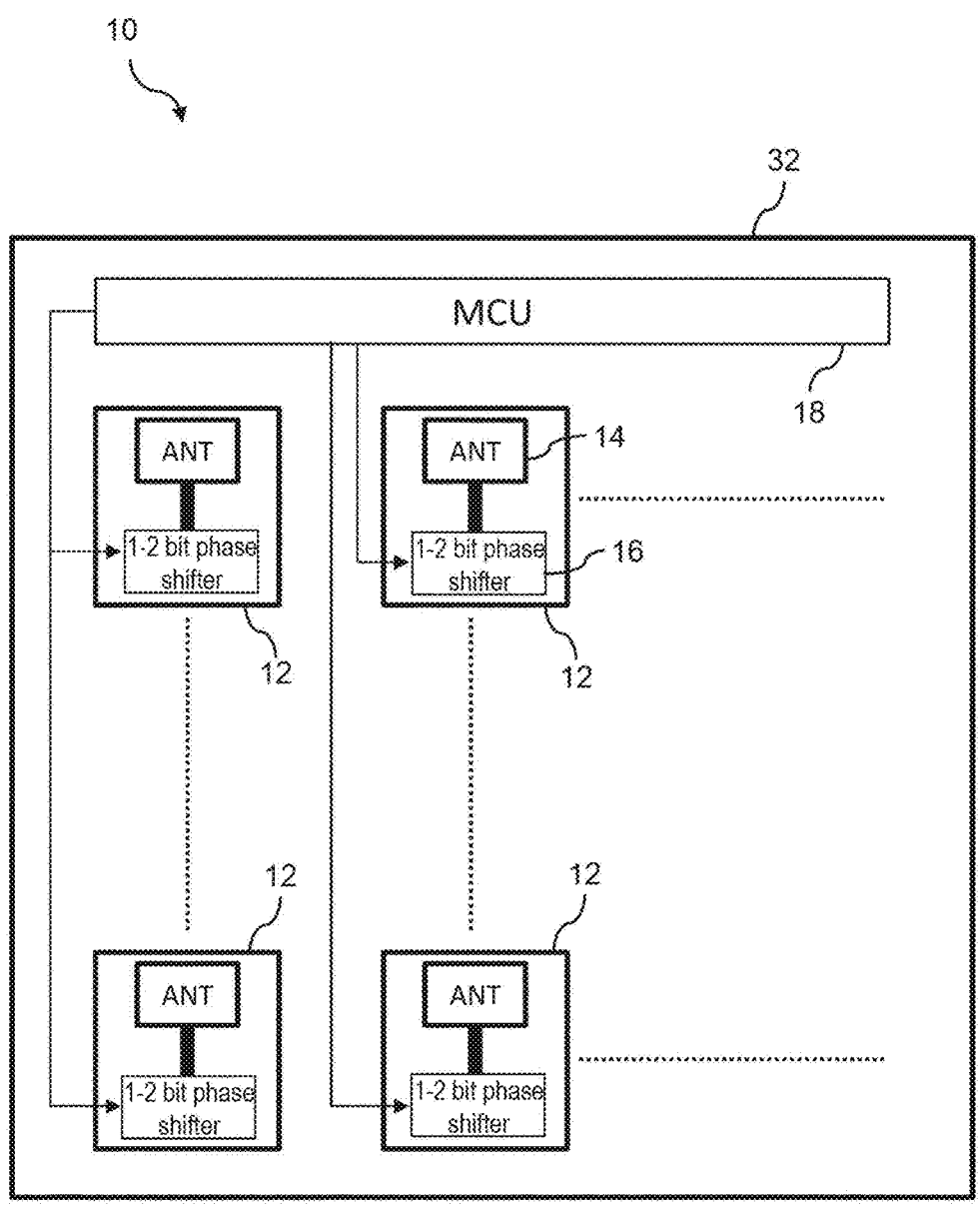
FIG. 1 is a schematic view illustrating a common RIS structure according to prior art.

The project leading to this application has received fund-ing from the European Union's Horizon 2020 research and innovation programme under the Marie Skłodowska-Curie grant agreement No 861222.

In accordance with an embodiment, the present invention improves and further develops a reflective device and a method for operating the same in such a way that high scalability in the communication infrastructure is achieved.

In accordance with another embodiment, the present invention provides a reflective device, comprising a control element and a reflective surface including a plurality of reflective elements, wherein each reflective element com-prises an antenna element and a phase shifting arrangement and is under control of the control element so as to reflect a radio-frequency, RF, signal incident on the reflective surface with an adjustable phase shift, wherein the reflective ele-ments are connected to the control element via a cell selection bus system that interconnects the reflective ele-ments.

Furthermore, in accordance with another embodiment, the present invention provides a method for operating a respec-tive reflective device as specified above, the method com-prising jointly controlling the reflective elements via a cell selection bus system that interconnects the reflective ele-ments.

The present invention provides a novel and inexpensive RIS hardware design that achieves scalability by using a common bus, denoted cell selection bus herein, for joint control of the reflective elements (sometimes synonymously denoted 'unit cells' herein) of a reflective element. In contrast to state-of-the-art designs, there is no direct connection between each of the unit cells and the control element. Instead, the unit cells are interconnected by means of the cell selection bus, which is connected to the control element, thereby providing more flexibility and scalability. The higher scalability in the communication infrastructure also increases the reconfiguration speed of the RIS.

Embodiments of the present invention provide a fully-passive RIS in form of a low-power programmable reflect-array conceived to manipulate the communication channel in a given environment, enhancing the received power by specific users, by means of passive beamforming, or minimizing the power towards non-relevant areas to reduce corresponding interference, or avoid unwanted eavesdroppers. A novel absorption state in every unit cell allows the device to dynamically adapt its layout and number of active antenna elements, to the needs of the application.

According to an embodiment of the invention, the reflective elements may be arranged in a grid fashion, i.e. in a two-dimensional array. In such arrangement, the cell selection bus system may comprise row buses that are designed to interconnect the reflective elements located on the same row of the array, and column buses designed to interconnect the reflective elements located on the same column of the array. In this way, each reflective element of the array is identified by a combination of a particular row bus and a particular column bus and can therefore be uniquely addressed.

According to an embodiment of the invention, each of the reflective elements may comprise an AND gate, wherein each AND gate is connected to exactly one row bus and exactly one column bus of the cell selection bus system. To address a particular reflective element, the respective row and column of the cell selection bus can be activated (e.g. set into a high state by applying via the control element a given voltage), such that they feed into the inputs of the AND gate for the respective reflective element.

According to an embodiment of the invention, the RIS may further comprise one or more phase configuration buses that are configured to communicate from the control element to a respective one of the reflective elements a desired setting of the reflective element's phase shifting arrangement. Specifically, the phase configuration buses may transmit phase bits that indicate a state or a phase shift that the respective reflective element has to apply according to the provisions of the control element, which could potentially be integrated into O-RAN architecture.

According to an embodiment of the invention, the phase shifting arrangement of the reflective elements may comprises a number of different open-ended transmission lines with specific lengths. Furthermore, the phase shifting arrangement may include a switching element that connects an input signal received via the antenna element of the reflective element to a specific one of the given transmission lines.

According to an embodiment of the invention, the switching element may include an RF switch that is configured to select a specific one of the given transmission lines based on an input control signal derived from the one or more phase configuration buses.

According to an embodiment of the invention, each unit cell may have an absorption state that can be selected. In this context commitment provided that an output of the RF switch is connected to an electronic component that matches the characteristic impedance of the respective transmission line (e.g., a resistor) such that, when selected, the reflective element is in an absorption state in which an input signal received via the antenna element of the reflective element is dissipated. In other words, the electronic component, since it matches the characteristic impedance of the transmission line, dissipates the incoming signal, which will not be radiated back. In this way, the reflective element is in an absorption state and the antenna element can be considered as turned off. Effectively, this feature provides the ability of changing the layout and number of active antenna elements in a dynamic way.

According to embodiments of the invention, the no-reflection effect can be also performed by exploiting non-purely resistive loads at the end together with other impedance-matching solutions, such as single stubs, L-networks, pi-networks, filters, or transformers. The choice of the right impedance-matching form could vary based on the available space and on the specific use-cases. Using impedance with non-zero imaginary part could be beneficial at higher frequency because a normal resistor could present a small capacitive or inductive part that might not be negligible and create imperfect matching, meaning reflections.

According to embodiments of the invention, the RIS may further comprise one or more flip-flops connected to the one or more phase configuration buses. The one or more flip-flops may be configured, when triggered, to read the current values from the one or more phase configuration buses and to transmit the values to the RF switch of the phase shifting arrangement. In an embodiment, the one or more flip-flops of the reflective element may be configured to use a rising edge of a high state exiting the AND gate of the reflective element as a trigger.

In this context, it may be provided that, in accordance with an embodiment of the invention, operation of the reflective device comprises: deriving, from the one or more phase configuration buses, an input control signal for a switching element of the phase shifting arrangement; using, by the switching element, the input control signal to select, for an input signal received via the antenna element of the reflective element, a specific one of a number of transmission lines; and connecting the input signal to the selected transmission line.

According to an embodiment, the process of deriving the input control signal from the one or more phase configuration buses may be performed by execution of the following steps: a) triggering, e.g. by means of a rising edge of a high state exiting the AND gate of the reflective element the one or more flip-flops connected to the one or more phase configuration buses, and b) deriving, by the one or more flip-flops when triggered, the current values from the one or more phase configuration buses and transmitting the derived values to the RF switch of the phase shifting arrangement.

According to an embodiment of the invention, the control element may be configured to dynamically adapt the RIS in terms of the number and the shape of active reflective elements by transmitting, via the phase configuration buses, control signals that effect a transition into the absorption state for respective ones of the reflective element.

According to an embodiment of the invention, the RIS may further comprise a serial port adapted to enable communication with external devices via a serial bus. Through the integration of serial bus it is possible to connect multiple RIS boards together in 2D dimensions, thereby attaining high modularity. The entirety of interconnected RIS boards can be jointly controlled, e.g., by a common central access point, AP.

There are several ways how to design and further develop the teaching of the present invention in an advantageous way. To this end, it is to be referred to the dependent claims on the one hand and to the following explanation of preferred embodiments of the invention by way of example, illustrated by the figure on the other hand. In connection with the explanation of the preferred embodiments of the invention by the aid of the figure, generally preferred embodiments and further developments of the teaching will be explained. In the drawing FIG. 1 schematically illustrates a conventional design for RIS 10 according to prior art. The RIS 10 comprises a reflective surface 32 including an array of unit cells 12, wherein each unit cell 12 includes an antenna element (ANT) 14 and a phase shifter 16. For the sake of simplicity, FIG. 1 depicts only two unit cells 12 of two selected rows and two unit cells 12 of two selected rows of the array.

The RIS 10 is under control of a microcontroller unit (MCU) 18 that communicates directly to the phase shifters 16 on the unit cells 12. This means that the number of necessary controller pins is equal to the number of antennas 14 times the number of bits for the phase shifter 16. In fact, for a 40-element RIS with 2-bit phase shifting and a common 100-pin controller unit, all its pins are almost completely assigned. Considering the above, the illustrated prior art solution proves to be disadvantageous in that it is not scalable.

Furthermore, thanks to their simplicity and compactness, pin diodes or varactors are mostly used as phase shifters 16. However, they are unable to prevent the associated antenna 14 from reflecting, which in turn prevents to configure the shape of the reflective surface in a conventional RIS.

Figure 2:
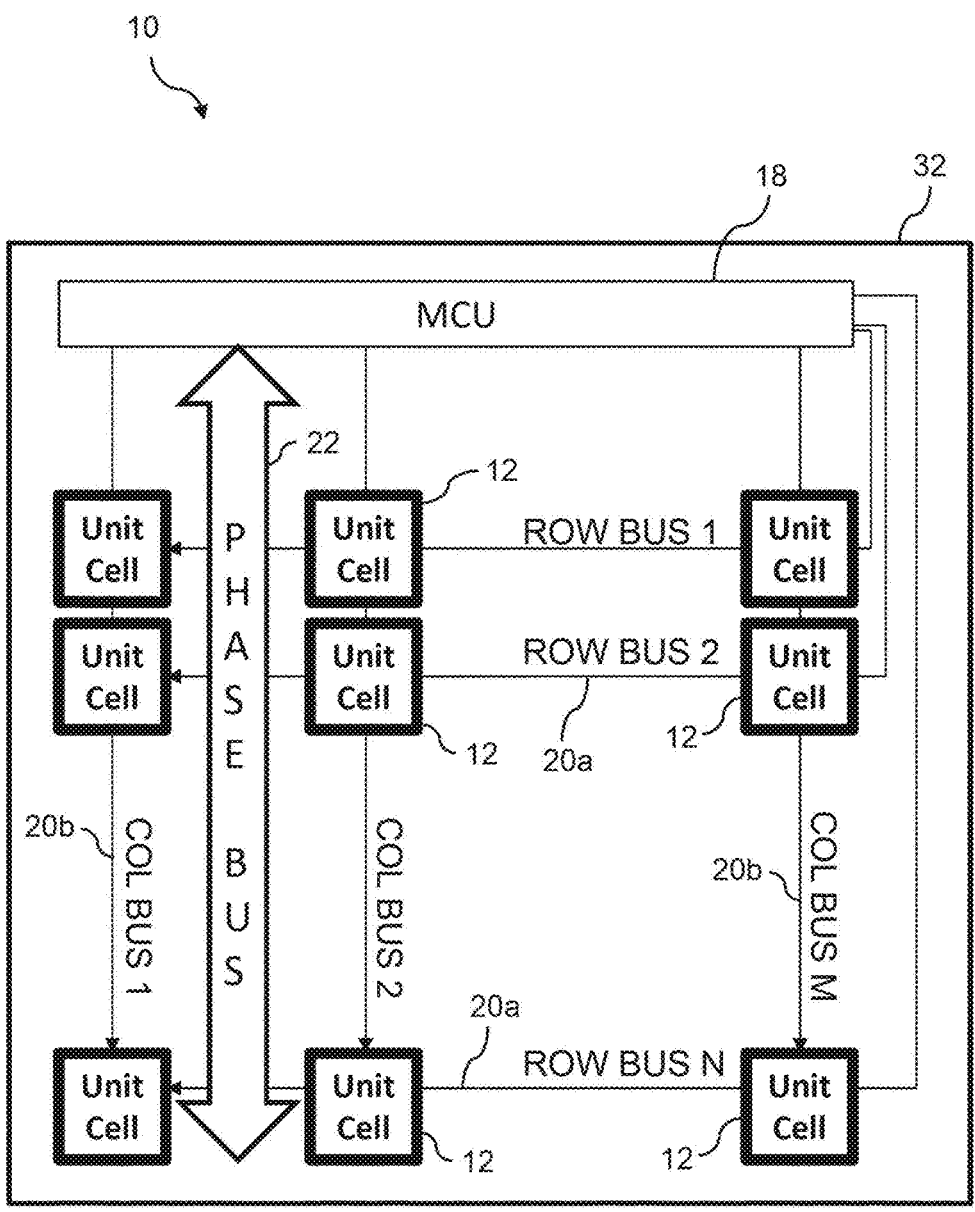
FIG. 2 is a schematic view illustrating the general struc-ture of a RIS in accordance with an embodiment of the present invention.

In order to overcome at least some of these issues, the present invention proposes a novel RIS design. FIG. 2 illustrates an embodiment of a RIS 10 according to this novel design, wherein like reference numerals denote like or similar components as in FIG. 1.

Like the conventional RIS of FIG. 1, the RIS 10 according to the embodiment of the invention shown in FIG. 2 consists of a grid or array of unit cells 12, each equipped with an antenna element. The antenna elements may be fabricated as a patch antenna, which is a particularly cheap antenna with narrow bandwidth and low gain, without requiring active RF chains.

According to the embodiment of FIG. 2, and in contrast to state-of-the-art designs, the microcontroller unit (MCU) 18 is not directly connected to each unit cell 12 since such approach, as explained above, has poor scalability. Instead, the unit cells 12 are interconnected by means of cell selection buses 20, thereby providing more flexibility and scalability.

For instance, the cell selection buses 20 may be realized in a grid fashion, as presented in FIG. 2. In this configuration, there are row buses 20a, connecting all the unit cells 12 on the same row of the array, and column buses 20b that, similarly, connect all the unit cells 12 on the same column of the array. As will be appreciated by those skilled in the art, it is not necessary that the unit cells 12 are arranged in a strictly orthogonal array, as shown in FIG. 2, and that other configurations can be realized likewise.

According to the illustrated embodiment, all cell selection buses 20 are assumed to be connected to AND gates, which are present for each unit cell 12. Accordingly, when row 'x' and column 'y' are activated (i.e. in a high state, by applying a voltage of typically 3.3 V), the respective buses 20a, 20b feed into the inputs of the AND gate for the element (x, y) in the grid, which will return a high state. All the remaining AND gates will output a low state (0V). In this way, when wishing to configure one individual unit cell 12, one simply has to select the appropriate pair of row-column cell selection buses 20a, 20b. With regard to scalability, it can be noted that, for instance, in a 10×10 array of unit cells 12, only 20 connections to the MCU 18 are required (10 column buses 20a+10 row buses 20b), instead of 100 direct connections assuming a conventional arrangement according to FIG. 1.

According to an embodiment of the invention, the RIS 10 may comprise an additional bus, namely a phase configuration bus 22 as shown in FIG. 2. The phase configuration bus 22 may be adapted to communicate from the MCU 18 to a respective unit cell 12 a desired configuration index (i.e. phase shift) out of a set of configurations possible on the selected unit cell 12.

According to an embodiment of the invention, the RIS 10 may be adapted to communicate with an external device, e.g. a PC, via a serial protocol. This protocol may be enabled by the MCU 18 that may be configured to receive interrupt signals even while being in a low power consumption mode. Messages may be generated, e.g., from an external access point (AP) and sent to the MCU 18 via a serial port.

Figure 3:
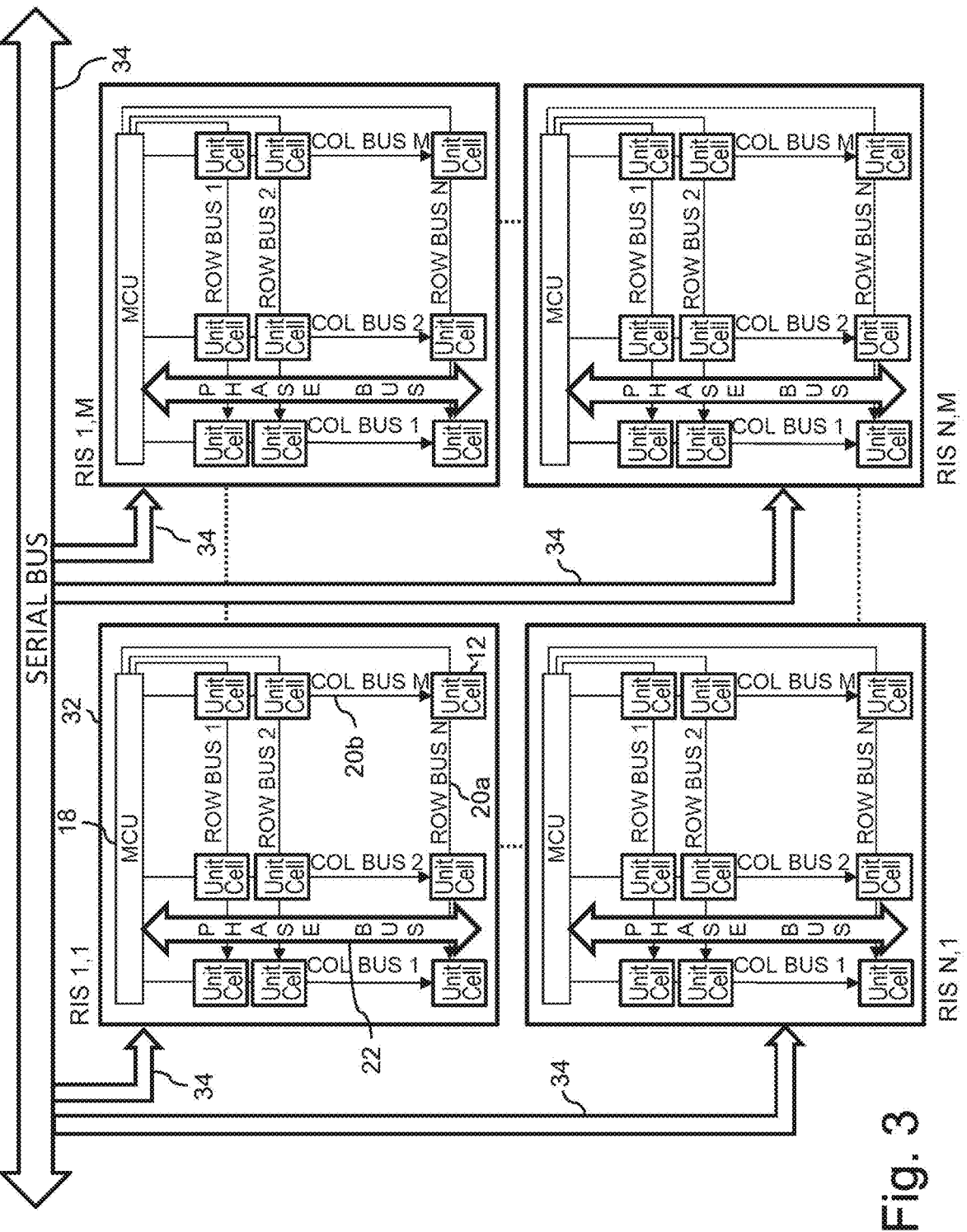
FIG. 3 is a schematic view illustrating a coupling of multiple RIS boards via a serial bus in accordance with an embodiment of the present invention.

By integrating, as exemplarily shown in FIG. 3, an additional bus, called "serial bus" 34 herein, it is possible to attain high modularity. That is, multiple RIS boards 10 can be connected together in 2D dimensions and jointly controlled, e.g., by a common central AP. In this context, it is important to guarantee that each RIS possesses its own unique ID that identifies the RIS board 10 in the bus.

Figure 4:
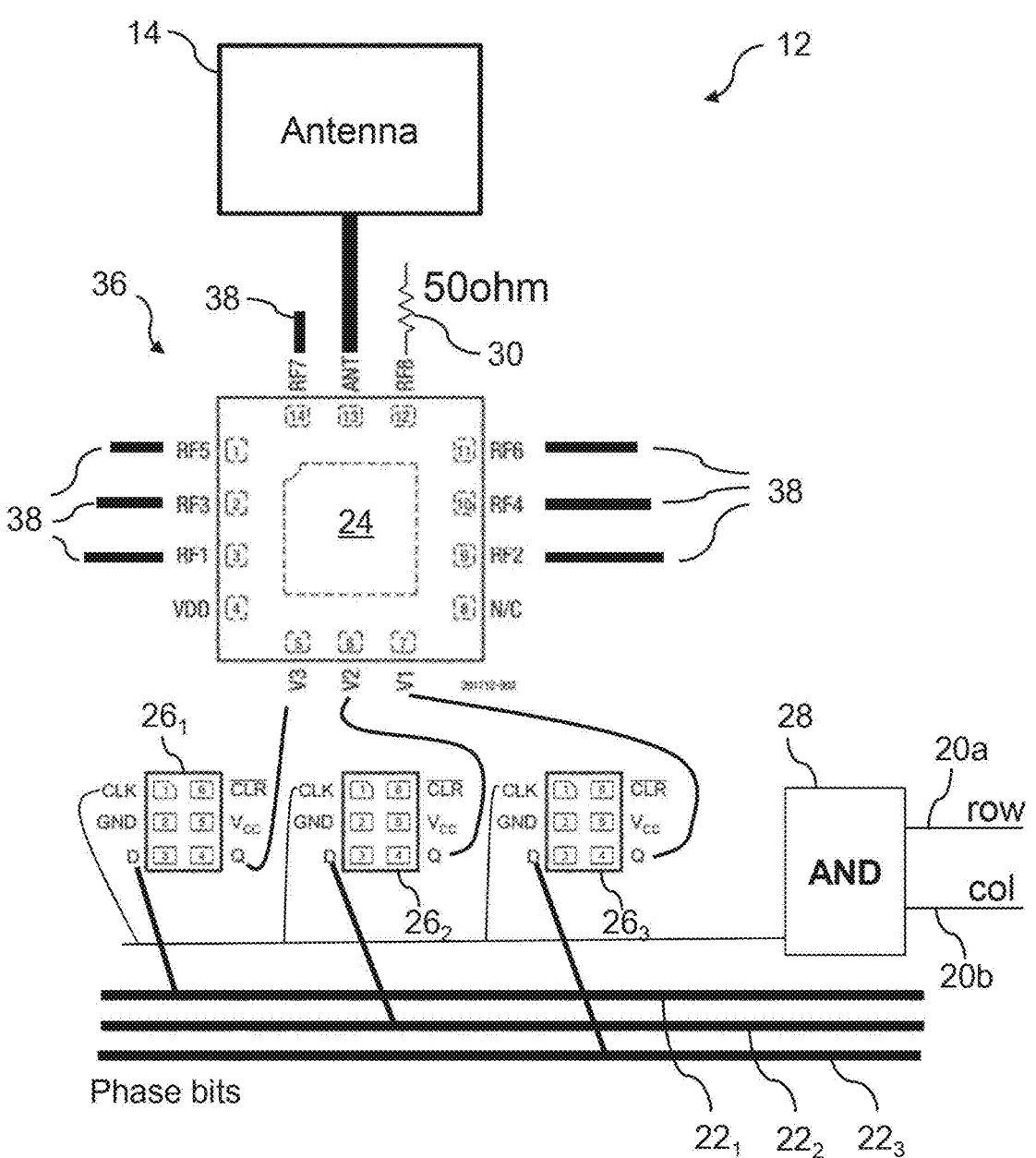
FIG. 4 is a schematic view illustrating the structure of a unit cell of a RIS in accordance with an embodiment of the present invention.

FIG. 4 schematically illustrates the setup of a unit cell 12 of a RIS in accordance with an embodiment of the present invention, including an antenna 14, a phase shifting arrangement 36, a number of flip-flops 26 and an AND gate 28. The main building block of the phase shifting arrangement 36 include a RF switch 24 with a number of transmission lines 38 of different lengths.

As already explained above, the AND gate 28 of the unit cell 12 is connected to cell selection buses 20 of the respective RIS including, e.g., a row selection bus 20a and a column selection bus 20b, as shown in FIG. 2. The output of the AND gate 28 is connected to each of the flip-flops 26. In the illustrated embodiment, the unit cell 12 comprises a number of three flip-flops $26_1$, $26_2$, and $26_3$. This number corresponds to the number of phase configuration buses 22, wherein flip-flop $26_1$ is coupled with a first phase configuration bus $22_1$, flip-flop $26_2$ coupled with a second phase configuration bus $22_1$, and flip-flop $26_3$ coupled with a third phase configuration bus $22_3$.

According to the illustrated embodiment, the high state that exits from the AND gate 28 (i.e. both the respective row selection bus 20a and the respective column selection bus 20b are powered) works as a rising edge for the flip-flops 26. Generally, flip-flops have the ability to store a 1-bit value as long as they are powered. Whenever one of the flip-flops 26 senses a rising edge (e.g., depending on the implementation, via its CLK input, as shown in FIG. 4), it checks the values in its input line, i.e. according to the implementation shown in FIG. 4, its D input connected to one of the phase configuration buses 22. Then, the flip-flops 26 update the respective value in memory and send it out as output to the RF switch 24, e.g. via output Q, as shown in FIG. 4. Specifically, when triggered, the flip-flops 26 read and save the current values from the respective one of the phase configuration buses 22, which are as many as the flip-flops 26. In fact, the phase configuration buses 22 transmit the phase bits that indicate a state or a phase shift that the respective unit cell 12 has to apply according to the provisions of the RIS's MCU 18.

The RF switch 24 is a device that can redirect an RF input (denoted V1-V3 in FIG. 4) to one of its possible outputs (denoted RF1-RF8 in FIG. 4). To select the desired output port, some values for encoding are necessary. According to embodiments of the invention, these values come from the flip-flops 26, as explained above.

Specifically, according to the embodiment of FIG. 4, each output of the RF switch 24 is connected to an open-ended transmission line 38 with its own specific length. Depending on the measure of the transmission line, a predefined delay in time can be added to the reflected signal, which effectively applies a phase shift to the impinging signal. Therefore, when an EM wave hits the antenna 14, which is connected to the RF switch 24, the signal travels to the RF-switch 24, then into a specific one of the transmission lines and it will bounce back from the antenna element 14. The selection of the transmission line is determined by the current RF input from the flip-flops 26. Accordingly, the unit cell 12 will re-radiate an impinging signal with a configured phase shift. By appropriately configuring each unit cell 12 of a RIS, it is possible to achieve beamforming gains passively.

Compared with the state of the art, the RIS according to the embodiment of FIG. 4 is provided with a higher phase shifting granularity: in fact, it is common to find in the literature 1-bit or sometimes 2-bit phase shifter. However, the design according to the present disclosure including three phase selection buses 22 and, correspondingly, three flip-flops 26 enables 3-bit resolution, meaning twice or more possible choices ($2^3$), leading to a more precise steering capability of the main beam. In this context, it is noted that according to embodiments of the present invention the RIS can be realized with a different number of flip-flops/phase selection buses, for instance two or four, depending on the desired phase shifting granularity.

According to an embodiment, the present invention provides a RIS comprising unit cells that have a novel absorption state, which can be selected. To this end, with reference to FIG. 4, one of the eight RF phase shifter outputs of the RF switch 24, namely the output denoted RF8, is connected to an electronic component that matches the characteristic impedance of the transmission line. In this way, it is achieved that an incoming signal will not be radiated back, but is dissipated instead. In the embodiment of FIG. 4, this electric component is implemented as a 50Ω resistor 30. As a result, the respective unit cell 12 is in an absorption state and the antenna element 14 can be considered as turned off.

This feature allows to dynamically change the number of active unit cells 12 of a RIS. An advantage of this approach is that it is possible to adapt the number of unit cells 12 to the requirements of the channel. For instance, when the RIS is supplied with a signal with good strength, only a portion of the antenna elements 14 are necessary, meaning a faster configuration time is achievable by turning off unnecessary unit cells 12.

Figure 5:
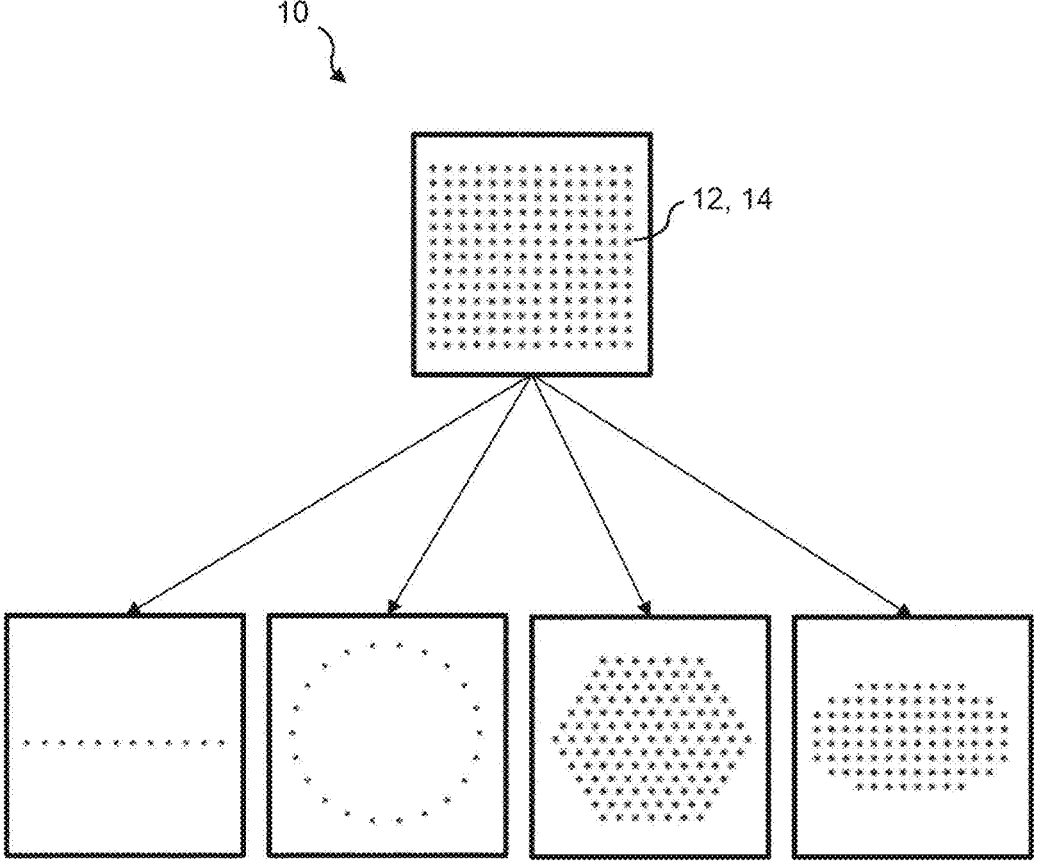
FIG. 5 is a schematic view illustrating virtual reshaping capabilities of a RIS in accordance with embodiments of the present invention.

In general, this (de-) activation feature adds a novel degree of freedom for the configuration of a RIS, as the inter-spacing distance between unit cells 12/antenna elements 14 can be increased or decreased as desired. As such, the shape of the element grid can be effectively and dynamically changed to any geometrical and even non-regular forms, as exemplarily shown in FIG. 5, thereby providing high flexibility in the shape of the reflective surface. For instance, using larger inter-space unit cell distance can create multiple symmetrical reflected lobes that can be exploited for serving multiple users (located at different physical locations) at the same time. Furthermore, by varying the number of active elements, the beam width of the reflected main beam can be made narrower to deliver the signal to a user confined in a small portion of space, or even enlarged to cover bigger area.

To summarize, embodiments of the present invention provide adaptive and flexible RIS modules by using reflective unit elements that can be dynamically set to an absorbing state to adapt the number of antenna elements that are active in every board and/or the distance between them to the needs of the application. According to another aspect, embodiments of the invention provide a modular design where RIS boards can be clustered together in 2D dimensions with a common bus for joint control.

Embodiments of the present invention also provide a modular RIS, which comprises an arbitrary and adaptive number of passive programmable unit cells that can be (re) arranged in any given geometry and are connected together by means of a common bus for joint control. Modularity can be achieved by means of a common bus, which allows to jointly control all the passive reflecting unit cells. The proposed design according to an embodiment of the invention allows to connect and control together any arbitrary number of RIS unit cells and arrange them in a given geometry. Indeed, the central controller exploits the common bus to (re) configure the desired phase shift at each unit cell, irrespective of their total number or geometrical disposition.

According to an additional or alternative aspect of the invention, an adaptive RIS size and shape is achieved by a novel unit cell design, with a reflective property that can be turned off by setting the unit cell into an absorption state. To this end, the unit cell may have a configurable RF switch with multiple output ports. All the ports except one are connected to transmission lines of different lengths, which provide a different phase shift over the impinging signals. One port is reserved and connected to an impedance matching device (e.g. resistor, transformers, etc.) in accordance to the characteristic impedance of the transmission line; this device effectively absorbs all the energy of the incoming signals, i.e., the reflective unit cell can be considered as turned off. This allows to adapt the effective shape of the RIS board (number of antennas, distance between antennas, etc.) to the needs of the application or use case.

According to a further aspect of the invention, the geometrical shape of the array can be virtually changed: usually RIS prototypes are presented in a square or rectangular shape, whereas the RIS as described in the present disclosure, thanks to the ability to turn off elements, can virtually reshape the array in other geometrical forms, changing in turn the main beam shape.

According to yet another aspect of the invention, the inter-distance between active unit cells is configurable, namely by turning of certain units cells as described above. This property can be used, for instance, to generate multiple beams by exploiting grating lobes or to generally adapt the RIS to the respective application scenario.

Many modifications and other embodiments of the invention set forth herein will come to mind to the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A reflective device, comprising:
a control element; and
a reflective surface comprising a plurality of reflective elements, wherein each reflective element of the plurality of reflective elements comprises an antenna element and a phase shifting arrangement and is under control of the control element so as to reflect a radiofrequency (RF) signal incident on the reflective surface with an adjustable phase shift, wherein the plurality of reflective elements are connected to the control element via a cell selection bus system that interconnects the plurality of reflective elements, wherein each reflective element of the plurality of reflective elements comprises an AND gate, and wherein each AND gate is connected to exactly one row bus and exactly one column bus of the cell selection bus system.

2. The device according to claim 1, wherein the plurality of reflective elements are arranged in a two-dimensional array, and
wherein the cell selection bus system comprises row buses interconnecting a first subset of the plurality of reflective elements that are located on a same row of the array and column buses interconnecting a second subset of the plurality of reflective elements that are located on a same column of the array.

3. The device according to claim 1, further comprising one or more phase configuration buses that are configured to communicate from the control element to a respective one of the reflective elements a desired setting of a corresponding phase shifting arrangement of the respective reflective element.

4. The device according to claim 3, wherein the phase shifting arrangement comprises a number of different open-ended transmission lines with specific lengths and a switching element that connects an input signal received via the antenna element of the reflective element to a specific one of the open-ended transmission lines.

5. The device according to claim 4, wherein the switching element includes an RF switch that is configured to select a specific one of the open-ended transmission lines based on an input control signal derived from the one or more phase configuration buses.

6. The device according to claim 5, wherein an output of the RF switch is connected to an electronic element that matches a characteristic impedance of the specific one of the open-ended transmission line such that, when selected, a corresponding reflective element is in an absorption state in which an input signal received via the antenna element of the corresponding reflective element is dissipated.

7. The device according to claim 5, further comprising one or more flip-flops connected to the one or more phase configuration buses, wherein the one or more flip-flops are configured, when triggered, to read current values from the one or more phase configuration buses and to transmit the values to the RF switch of the phase shifting arrangement.

8. The device according claim 7, wherein the one or more flip-flops of a reflective element of the plurality of reflective elements are configured to use a rising edge of a high state exiting the AND gate of the reflective element as a trigger.

9. The device according to claim 6, wherein the control element is configured to dynamically adapt a number and a shape of active reflective elements by transmitting, via the phase configuration buses, control signals that effect a transition into the absorption state for respective ones of the reflective element.

10. The device according to claim 1, further comprising a serial port adapted to enable communication with external devices via a serial bus.

11. A method of operating a reflective device according to claim 1, the method comprising:
jointly controlling the plurality of reflective elements via the cell selection bus system that interconnects the plurality of reflective elements.

12. The method according to claim 11, further comprising:
deriving, from one or more phase configuration buses, an input control signal for a switching element of the phase shifting arrangement;
using, by the switching element, the input control signal to select, for an input signal received via the antenna element of a respective reflective element, a specific one of a number of transmission lines; and
connecting the input signal to the selected transmission line.

13. The method according to claim 12, wherein deriving the input control signal from the one or more phase configuration buses comprises:
triggering, by a rising edge of a high state exiting the AND gate of a reflective element of the plurality of reflective elements, one or more flip-flops connected to the one or more phase configuration buses;
deriving, by the one or more flip-flops when triggered, the current values from the one or more phase configuration buses and transmitting the derived values to an RF switch of the phase shifting arrangement.

14. The method according to claim 11, further comprising:

dynamically adapting a number and a shape of active reflective elements by transmitting, via the phase configuration buses, control signals that effect a transition into an absorption state for respective ones of the reflective element.

15. A reflective device, comprising:

a control element; and a reflective surface comprising a plurality of reflective elements, wherein each reflective element of the plurality of reflective elements comprises an antenna element and a phase shifting arrangement and is under control of the control element so as to reflect a radio-frequency (RF) signal incident on the reflective surface with an adjustable phase shift, and wherein the plurality of reflective elements are connected to the control element via a cell selection bus system that interconnects the plurality of reflective elements; and one or more phase configuration buses that are configured to communicate from the control element to a respective one of the reflective elements a desired setting of a corresponding phase shifting arrangement of the respective reflective element, wherein the phase shifting arrangement comprises a number of different open-ended transmission lines with specific lengths and a switching element that connects an input signal received via the antenna element of the reflective element to a specific one of the open-ended transmission lines.

16. The reflective device according to claim 15, wherein the switching element includes an RF switch that is configured to select a specific one of the open-ended transmission lines based on an input control signal derived from the one or more phase configuration buses.

17. The reflective device according to claim 16, wherein an output of the RF switch is connected to an electronic element that matches a characteristic impedance of the specific one of the open-ended transmission line such that, when selected, a corresponding reflective element is in an absorption state in which an input signal received via the antenna element of the corresponding reflective element is dissipated.

18. The reflective device according to claim 16, further comprising one or more flip-flops connected to the one or more phase configuration buses, wherein the one or more flip-flops are configured, when triggered, to read current values from the one or more phase configuration buses and to transmit the values to the RF switch of the phase shifting arrangement.

19. The reflective device according to claim 18, wherein the one or more flip-flops of a reflective element of the plurality of reflective elements are configured to use a rising edge of a high state exiting an AND gate of the reflective element as a trigger.

20. The reflective device according to claim 17, wherein the control element is configured to dynamically adapt a number and a shape of active reflective elements by transmitting, via the phase configuration buses, control signals that effect a transition into the absorption state for respective ones of the reflective element.

* * * * *